United States Patent [19]

Stampfli

[11] 4,257,573
[45] Mar. 24, 1981

[54] ELECTROMAGNETIC VALVE WITH SERVO-CONTROL

[75] Inventor: Harald Stampfli, Petit-Saconnex, Switzerland

[73] Assignee: Lucifer S.A., Carouge-Geneva, Switzerland

[21] Appl. No.: 26,725

[22] Filed: Apr. 3, 1979

[30] Foreign Application Priority Data

Apr. 4, 1978 [CH] Switzerland .................... 3590/78

[51] Int. Cl.³ .................................... F16K 31/128
[52] U.S. Cl. .................................... 251/30; 137/625.64
[58] Field of Search ........... 251/30; 137/625.6, 625.64

[56] References Cited

U.S. PATENT DOCUMENTS

| 2,659,197 | 11/1953 | Halford et al. | 251/30 X |
| 3,181,567 | 5/1965 | Deutsch et al. | 251/30 X |

Primary Examiner—Arnold Rosenthal
Attorney, Agent, or Firm—Emory L. Groff, Jr.

[57] ABSTRACT

An electromagnetic valve with servo-control is controlled by a movable core. The fluid under pressure contained in the chamber for the servo-control passes by a stationary seat capable of being closed by a flap valve on the core. The seat is fed by fluid under pressure through a conduit in a movable valve through a sliding tube. This tube can be made of plastic material and be reinforced by an externally mounted spring.

2 Claims, 1 Drawing Figure

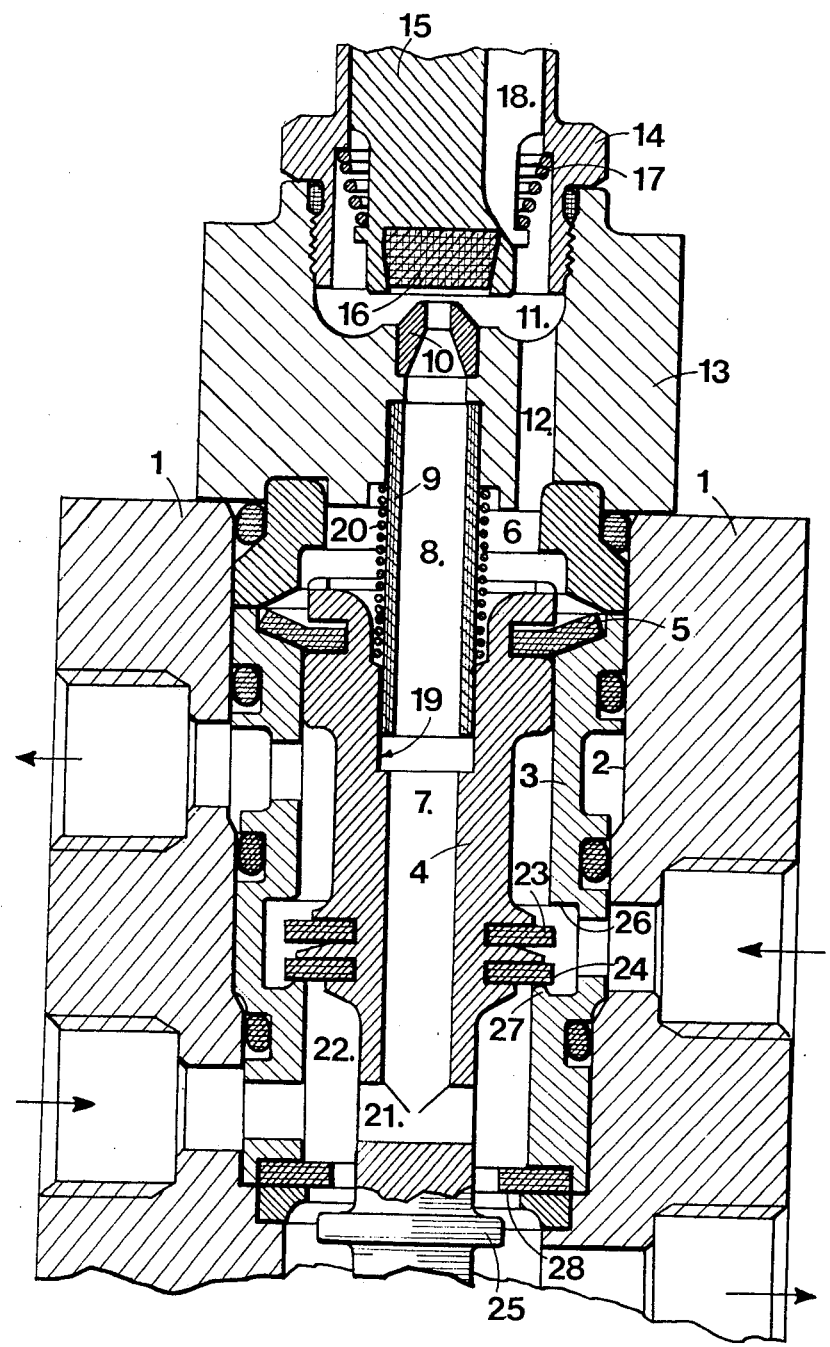

ELECTROMAGNETIC VALVE WITH SERVO-CONTROL

U.S. Pat. No. 3,181,567 relates to a valve with servo-control having an active member axially displaceable under fluid pressure in a work chamber. The admission and escape of the fluid in the chamber is controlled by an electromagnetically movable core slidable in a tube. A return spring is provided for the core. The core includes two obturators cooperating respectively with seats for admission and escape of fluid. The active member has an inner axial boring communicating through a coaxial tubular member to one of said seats. The tubular member is slidably mounted to permit displacement of said active member relative to the body of the valve.

The present invention has for its object a valve of the foregoing type, the construction of which is simple and inexpensive and whose function is excellent. This object is achieved due to the fact that the tubular member is made of resilient material. A helical spring surrounds the outer cylindrical surface of the tubular member and bears against the active member at one end and against a valve body part at the other end.

The attached drawing shows schematically and by way of example a preferred form of execution of a valve according to the present invention.

The single FIGURE of the drawing shows a cross-section of a portion of the valve.

The valve shown is of the flap valve type. It comprises a main body 1 having a bore 2 in which is located a casing 3 having openings for the passage of the fluid to be controlled. Valves of this type are well known and can be made in any of a number of ways.

In the interior of the casing 3 there is located the active part of the valve comprising a slide valve 4. Near its upper end, shown in the drawing, the valve 4 carries an annular membrane 5 to assure the tight closing of a chamber 6, a portion of the wall of which is formed by the end face of the valve 4 and by said membrane 5.

The valve 4 carries flap valves 23, 24, and 25 intended to cooperate with seats 26, 27 and 28 for the control of the fluid.

The position shown in the drawing is that in which the chamber 6 is fed fluid under pressure coming from a longitudinal conduit 7 in the valve 4, the fluid under pressure being admitted into the conduit 7 through an opening 21 leading to a chamber 22 permanently fed by the fluid under pressure which is well known in itself.

The fluid under pressure coming from the conduit 7 feeds the chamber 6 through the interior space 8 of a tubular member 9, a seat 10, a chamber 11 and bore 12 communicating with the chamber 6.

The seat 10, the chamber 11 and the bore 12 are disposed in a part 13 fixed to the body 1 of the valve. This part 13 carries on its upper end a collar 14 in which a movable core 15 slides, the movable core having at its lower end a valve member 16 to obturate the seat 10.

The displacements of the core 15 are controlled against the action of a return spring 17 by a magnetic field produced by a winding not shown.

The upper end of the core 15, not shown, also carries a flap valve cooperating with a seat for the escape of the fluid. In this manner, when the core 15 occupies the position shown in the drawing, the escape seat, not shown, is sealed. In the other position of the core 15 the fluid contained in the chamber 6 can escape through the escape seat by passing through the bore 12 and by means of a longitudinal channel 18 in the core 15.

In order to permit displacement of the slide valve 4 with reference to the part 13, the tube 9 is slidably mounted in a bore 19 which is an extension of the conduit 7 of slide valve 4. The outer surface of the tube 9 is surrounded by a spring 20 which increases the resistance of tube 9 in a situation where it is made of a resilient material.

It is evident that the tube 9 could be fixed with reference to the slide valve 4 and slidably mounted in part 13 carrying the stationary seat 10. The tube 9 could therefore be replaced by means of two tubular pieces slidable one within the other.

I claim:

1. An electromagnetic valve with servo control, comprising a valve body having a body part fixed thereto, said valve body formed with a work chamber therein, an active member axially displaceable under fluid pressure contained in said work chamber, a tube attached to said body part, an electromagnetically movable core slidable in said tube, a valve seat in said body part, said core having an obturator engageable with said valve seat for controlling admission and escape of fluid, said active member having an inner axial boring, a coaxial tubular member mounted at one end in the body part and at the other end in the axial boring of said active member, said tubular member being slidably mounted to permit displacement of said active member relative to the body part of the valve, said tubular member being made of resilient material, a helical spring engaging the outer surface of the tubular member and bearing against said active member at one end and against the body part at the other end.

2. A valve according to claim 1 wherein, the ends of the tubular member are engaged, respectively, in bores of corresponding diameter provided in said body part and in said active member.

* * * * *